Figure 1:
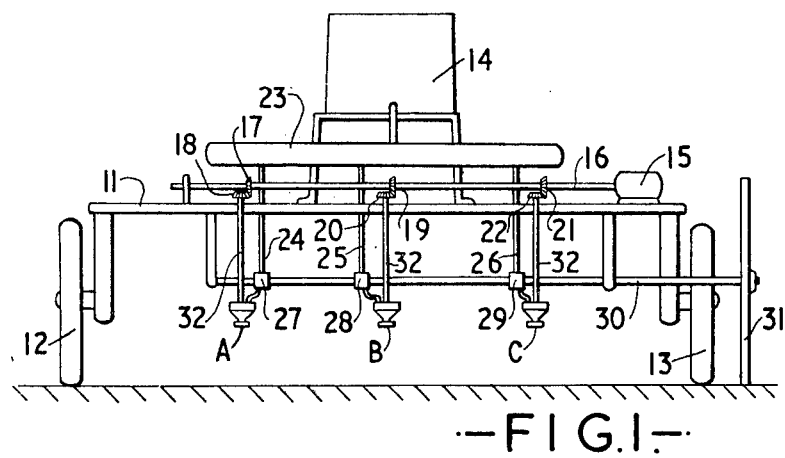

United States Patent [19]

Farmery

[11] 4,006,858
[45] Feb. 8, 1977

[54] SPRAY APPARATUS
[75] Inventor: Horstine Farmery, North Newbald, England
[73] Assignee: Horstine Farmery Limited, North Newbald, England
[22] Filed: Feb. 17, 1976
[21] Appl. No.: 658,841
[30] Foreign Application Priority Data
  Feb. 27, 1975 United Kingdom ............... 8300/75
[52] U.S. Cl. .................................. 239/7; 239/156; 239/222; 239/223
[51] Int. Cl.² ......................................... B05B 1/28
[58] Field of Search ............. 239/222, 222.11, 223, 239/7, 224, 156

[56] References Cited
UNITED STATES PATENTS

| | | | |
|---|---|---|---|
| 3,199,786 | 8/1965 | Waldrum | 239/223 |
| 3,344,836 | 10/1967 | Kopczynski | 239/223 X |
| 3,749,313 | 7/1973 | Weitmann | 239/224 |
| 3,885,496 | 5/1975 | Breitweb et al. | 239/222 X |

Primary Examiner—John J. Love
Attorney, Agent, or Firm—Bacon & Thomas

[57] ABSTRACT

A method and apparatus for distributing a flowable material over a base surface and wherein said flowable material is centrifuged from the peripheral region of a rotary member to produce an annular spray pattern, concentric with the rotational axis of the rotary member, and said rotary member is displaced over the base surface, characterized in that the annular spray pattern issuing from the periphery of said rotary member is interrupted at two locations, spaced apart, to obtain, at the base surface, two arcuate spray patterns, and the flowable material interrupted at said two locations is directed to a second rotary member and centrifuged from a peripheral region thereof to produce an annular spray pattern at said base surface. Preferably the two arcuate spray patterns are superimposed on the annular spray pattern to obtain a uniform distribution of material transverse to the direction of travel.

15 Claims, 4 Drawing Figures

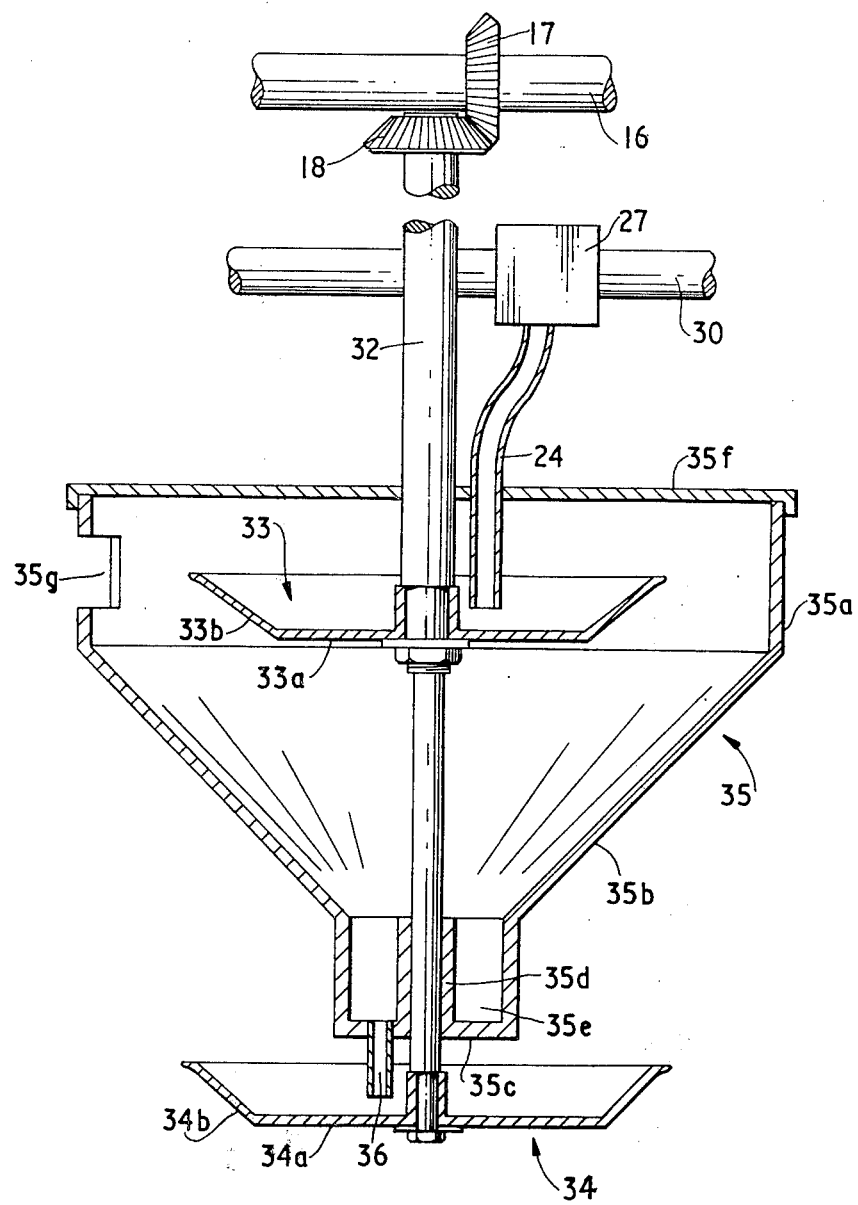
-FIG.2-
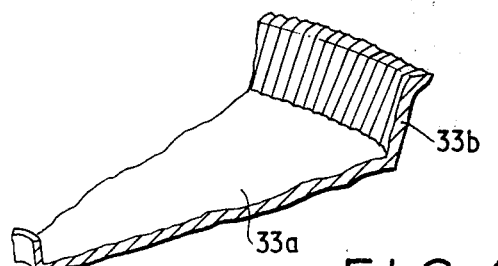
-FIG.4-

SPRAY APPARATUS

This invention relates to a method and apparatus for distributing flowable material and has particular application to the distribution of chemical aids onto, or into, growing crops.

In our copending American patent application Ser. No. 600,948 filed Aug. 1, 1975, there is disclosed a method for distributing a flowable material comprising the steps of centrifuging the material from a peripheral region of a rotary member to produce a spray pattern substantially uniformly disposed about the axis of rotation of the rotary member and interrupting the free flow of material in the uniform spray pattern at a plurality of locations spaced about the axis of rotation of the rotary member to establish a spray pattern defined by selected sectors of the initial spray pattern.

According to the present invention there is provided a method for distributing a flowable material over a base surface comprising the steps of centrifuging flowable material from the periphery of a first rotary member, interrupting the free flow of material from two diametrically opposed sectors of the rotary member, directing the flowable material arrested by said interrupting sectors onto a second rotary member and centrifuging the material delivered to the second rotary member freely from the periphery of said member, the free flow of material from the periphery of the first rotary membr between the said arresting sectors constituting in the region of 50% of the material delivered to said first rotary member.

Preferably said two arresting sectors are of substantially unequal angular configuration and the sectors therebetween are of substantially uniform angular configuration.

Preferably the non-interrupted sectors are so aligned relative to the intended path of travel for the first rotary member over the base surface that said non-interrupted sectors produce two arcuate spray patterns, the mid-points of which at ground level lie in a plane parallel to the intended path of travel.

In a preferred embodiment of the present invention for spraying liquid chemical aid to assist growing crops, the apparatus is mounted on a vehicle for traversing the apparatus over the ground and the apparatus is so aligned that the leading non-interrupted sector produces a spray pattern forward of the device and, at ground level, substantially uniformly to each side of the path of travel and the rear non-interrupted sector produces a spray pattern rearwardly of the device and substantially uniformly to each side of the path of travel whereby, when the apparatus is advanced, the spray pattern rearwardly of the device delivers liquid aid to the ground previously sprayed by the spray pattern of the leading non-interrupted sector. The amount of liquid delivered to the second rotary member preferably comprises substantially 50% of the liquid initially supplied to the first rotary member and is released from the second rotary member substantially uniformly from the periphery thereof. Conveniently the liquid chemical aid supply to the first rotary member is regulated by a ground wheel so that the amount of chemical aid supplied is directly related to the forward speed of the vehicle.

According to a feature of the present invention there is provided a method and apparatus for delivering a liquid onto a base surface from a vehicle moving over said base surface at a substantially uniform speed and wherein two rotary members are each supplied with equal amounts of liquid at a substantially constant rate, the liquid dispersed from one of said rotary members is centrifuged from the periphery of said member and falls uninterrupted to produce a substantially annular spray pattern at the base surface, the liquid supplied to the other rotary member is centrifuged from the periphery thereof and the spray pattern is interrupted at two diametrically opposite locations to produce a spray pattern forward of the rotary member in the direction of travel and a spray pattern rearwardly of the rotary member in the direction of travel, the forward spray pattern, at base level, having a transverse width narrower than the annular spray pattern having a transverse width narrower than that of the forward spray pattern and the forward and rearward spray pattern being super-imposed on the annular spray pattern, so that the annular spray pattern is delivered onto a predetermined width of base surface, the forward spray pattern is delivered onto a mid-region of the predetermined width and the rearward spray pattern is delivered onto a mid-region of the base surface affected by the forward spray pattern.

Figure 3:
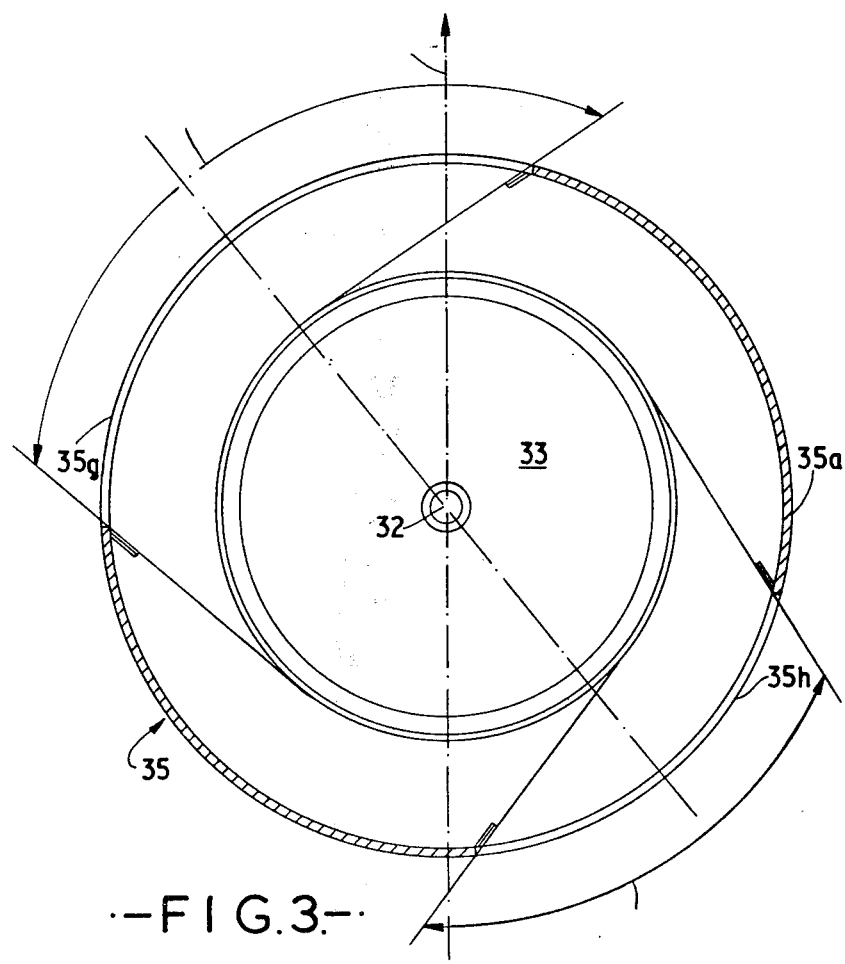

The invention will now be described further by way of example with reference to the accompanying drawings in which;

FIG. 1 shows, diagrammatically, a rear view of a towable, wheeled vehicle for spraying crops, FIG. 2 shows a vertical center line section through a spray assembly, FIG. 3 shows a plan development for a mask for the spray assembly shown in FIG. 2, and FIG. 4 shows a detail perspective view of a part of a rotary member suitable for use with the spray assembly shown in FIG. 2.

In the apparatus shown in FIG. 1 a frame 11 supported by two freely rotatable ground wheels 12 and 13, includes a towing frame arrangement (not shown) by which the vehicle 11, 12, 13, can be towed by a powered vehicle such as a tractor, or Land Rover (not shown). The frame 11 supports three spray assemblies, A, B and C, equally spaced transverse to the direction of travel for the vehicle 11, 12, 13, a tank 14 for liquid chemical aid and a motor 15, arranged to run at a substantially uniform speed and to drive the three spray assemblies A, B and C via a drive shaft 16 and bevel gears 17, 18, 19, 20 and 21, 22 respectively.

The tank 14 supplies chemical aid to the three assemblies A, B and C via a manifold pipe 23 and three supply pipes 24, 25 and 26. Each supply pipe 24, 25 and 26 includes a metering valve 27, 28, 29 respectively controlled by a shaft 30 rotated by a ground wheel 31 so that the spray assemblies A, B and C are uniformly supplied with liquid chemical aid via supply pipes 24, 25 and 26 and the supply of liquid to said spray assemblies is directly related to ground speed of the vehicle.

The spray assemblies A, B and C are identical in construction and operation and therefore, to avoid repetition, only the spray assembly A will be described in detail and it will be appreciated that spray assemblies B and C will have the same parts and opertional functions disclosed with respect to assembly A.

The spray assembly shown in FIG. 2 comprises a vertical drive shaft 32, rotated by bevel gear 18 mounted on shaft 32 and meshing with bevel gear wheel 17 on drive shaft 16, upon which a first rotary member 33 and a second rotary member 34 are secured in vertically spaced relationship. The rotary members 33 and 34 are identical and each comprises a flat annular base 33a and 34a respectively with an outwardly flared peripheral flange 33b and 34b respectively.

The first rotary member 33 is located within a fixed housing 35 comprising a cylindrical wall section 35a, within which the member 33 is located, and a lower conical section 35b which has its lower regions turned inwardly as at 35c and upwardly as at 35d to define an annular reservoir 35e surrounding the drive shaft 32. The housing 35 is closed by a lid 35f through which the feed end of the liquid chemical aid suply pipe 24 passes to deliver chemical aid onto the upper surface of the base 33a, close to the shaft 32, and an outlet pipe 36 allows liquid chemical aid collected in the annular reservoir 35e to flow therefrom to a delivery end of pipe 36 above the annular base 34a of rotary member 34 close to the shaft 32.

The cylindrical wall section 35a has two slots 35g and 35h therein, vertically located to allow free passage of liquid material discharged from the rotary member 33 towards the circumferential length of the slots 35g and 35h, and the said slots 35g and 35h are arranged substantially diametrically opposite to one another relative to the rotational axis for the shaft 32.

With the apparatus described thus far the angle of the slots 35g and 35h and their locations relative to the intended direction of travel are most important if an acceptable spray pattern is to be obtained.

In one arrangement which has been found acceptable in practice the rotary members 33 and 34 each have an effective peripheral diameter of 80 m.m. and said members are rotated at 1600 rpm, the internal diameter of the cylindrical wall section 35a is 116 m.m. and the slot 35g, intended to be the leading slot in the intended direction of travel, extends through 107° whilst the trailing slot 35h extends through 70° 12'. As the liquid droplets centrifuged from the periphery of the rotary member 33 are discharged tangentially the leading slot 35g and the trailing slot 35h are both offset from the central plane of the assembly parallel to the direction of travel, as will be seen in FIG. 3, so that the liquid chemical aid centrifuged through the slots 35g and 35h produces, at ground level, a transverse spray pattern equally spaced on both sides of the vertical plane passing through the axis of shaft 32 and parallel to the direction of travel.

In practice, with the parts having the above defined dimensions and with the shaft 32 rotating at 1600 rpm in the clockwise direction when viewed from above, the housing 35 is so located that the plane passing through the axis of rotation for shaft 32 and through the midpoints of slots 35g and 35h is off-set from the direction of displacement in the anti-clockwise direction by an angle in the region of 39° 30' as will be seen in FIG. 3.

The spray assembly A operates as follows:

With the motor 15 driving shaft 32 at constant speed and with the assembly travelling along a desired path whereby the valve 27 is at least partially open to allow a metered flow of liquid chemical aid to flow from tank 14 through pipe 24 and onto the rotary member 33, the liquid chemical aid is centrifuged from the peripheral edge of the flange 33b at a substantially uniform rate about said peripheral edge. The droplets centrifuged from the flange 33b have a velocity component tangential to said flange 33b and those droplets directed through the slot 35g spray the ground forward of the device and the droplets directed through the slot 35h spray the ground behind the device. The spray patterns forwardly and rearwardly each have their mid-points lying in the plane passing through the axis of the shaft 32 and parallel to the direction of travel at ground level due to the off-set locations of the slots 35g and 35h relative to the direction of travel.

With a slot 35g having a circumferential length equal to 107° and a slot 35h having a circumferential length of 70° 12' the total slot length in cylindrical wall 35a is equal to 177° 12' so that slightly less than 50% of the liquid chemical aid supplied to member 33 issues from the housing 35 and the droplets centrifuged by the rotary member 33 and striking the inside surface of the housing 35 run down the conical section 35b into the annular reservoir 35e and through outlet pipe 36 onto the rotary member 34. The liquid chemical aid discharged onto rotary member 34 is centrifuged, without interruption, from the periphery of member 34 and thus constitutes slightly in excess of 50% of the chemical aid supplied to member 33.

It has been found in practice that a spray assembly as described above offers a spray pattern which achieves a substantially uniform distribution of liquid chemical aid transverse to the direction of travel and, as the amount of chemical aid supplied to the assembly is directly controlled by a ground wheel, the distribution in the direction of travel is also substantially uniform. Further, by spacing a plurality of spray assemblies transverse to the direction of travel, as in the example shown in FIG. 1, assemblies A, B and C, with the spray patterns of adjacent spray assemblies just touching or over-lapping at ground level, the towed vehicle can spray a relatively wide path and obtain a substantially uniform distribution of chemical aid per unit area of the ground transversed.

A further important factor in the spray proposed by the present invention is of course the height of the spray assemblies above ground level. It has been found in practice that using a spray assembly of the type described as assembly 'A' hereinbefore, with most chemical aids, and with the rotary member 34 set 15 inches above ground level a spray pattern some 1m–25mm wide is obtained. If the height of the assembly is lowered, the width of the spray pattern is reduced and if the assembly is elevated a limited increase in the width of the spray pattern is obtained but the higher the assembly is elevated above ground level the more the spray pattern is influenced by ambient conditions and thus, whilst height adjustment of the spray assembly should be effected to obtain the optimum spray pattern for a specific liquid chemical aid, such height should be carefully controlled to prevent disruption of the pattern due, for example, to wind conditions.

In the foregoing specific example the rate of liquid flow to the assemblies A, B and C is directly controlled by the ground wheel 31 so as to be directly related to the forward speed of the spray apparatus. It will be appreciated that a predetermined minimum and maximum liquid supply rate is necessary to establish the desired spray patterns for the apparatus and accordingly the valves 27, 28 and 29, or additional valves in the liquid supply system, may be provided with cut-out means for terminating the flow of liquid to the assemblies A, B and C when the forward speed falls below, or rises above, a predetermined range. Alternatively, the ground wheel control may be dispensed with and the valves 27, 28 and 29 directly controlled by the towing vehicle whilst in a very simple arrangement the valves 27, 28 and 29 may be on-off metering valves manually controlled by the spray assembly operator.

Further, the drive to the drive shafts 32, shown as being effective from motor 15 via shaft 16 and bevel gears 17, 18, 19, 20 and 21, 22, may be replaced by air motors directly connected to the shafts 32 and supplied with air from the towing vehicle or said drive may be effected by an electric motor to each shaft 32 and supplied with power from batteries on the frame 11 or on the towing vehicle, or from a generator on the towing vehicle.

Further, the spray assemblies A, B and C need not be mounted on a wheeled trailer separate from the towing vehicle and thus said assemblies may be mounted on a boom or booms directly supported on the towed vehicle, i.e. on the rear of a tractor.

Whilst the present invention has been described by way of example with reference to a specific embodiment and preferred alternative arrangements for selected parts it will be apparent to persons skilled in the art and such constructions as utilize two rotary members for effecting a spray pattern including a forward arcuate pattern and a rearward arcuate pattern superimposed on a 360° spray pattern, must lie within the scope of this invention.

I claim:

1. A method for distributing a flowable material over a base surface comprising the steps of rotating two rotary members in vertically spaced relationship about a common vertical axis, centrifuging flowable material from the upper one of said rotary members to obtain a substantially annular spray pattern from said upper rotary member, interrupting the annular spray pattern from the upper one of said rotary members at two locations spaced apart but concentric with the rotational axis of the said rotary members whereby to reduce the said annular spray pattern to two separated arcuate spray patterns, directing the interrupted material from the annular spray pattern to the lower one of said rotary members and centrifuging said material from said lower rotary member to obtain an annular spray pattern therefrom, and whereby the two arcuate spray patterns produced from the upper one of said rotary member is superimposed on the annular spray pattern from the lower one of said rotary members.

2. A method as claimed in claim 1 and wherein the two arcuate spray patterns are of different angular length.

3. A method as claimed in claim 1 and wherein the two arcuate spray patterns are oppositely directed.

4. A method as claimed in claim 1, and wherein between 45% and 55% of the flowable material centrifuged from the upper one of said rotary members is interrupted and directed to the lower one of said rotary members.

5. A method as claimed in claim 1, and wherein said two rotary members are displaced in unison over said base surface with one of said arcuate spray patterns directed in the direction of travel and the other arcuate spray pattern directed oppositely to the direction of travel.

6. A method as claimed in claim 1 in which the midpoints of the two arcuate spray patterns lie, at the base surface, on the vertical plane passing through the rotational axis of the two rotary members, and parallel to the direction of travel.

7. Apparatus for distributing a flowable material over a base surface and comprising a vertical drive shaft, two rotary members mounted on said drive shaft in vertically spaced relationship, and a mask surrounding the upper one of said rotary members and having two slots therein in the plane of material centrifuged from the upper one of said rotary members, said mask including a funnel portion in which material interrupted by the mask walls between said slots can collect, and a duct for discharging the material collected in said mask to the lower one of said rotary members.

8. Apparatus as claimed in claim 7 and wherein said slots are of unequal circumferential length.

9. Apparatus as claimed in claim 7 and wherein the sum of the circumferential lengths of the two slots is substantially equal to the sum of the circumferential lengths of the mask walls between said slots.

10. Apparatus as claimed in claim 7, and wherein the two mask walls separating the two slots are of equal circumferential length.

11. Apparatus as claimed in claim 7, and wherein one of said slots has an angular length of some 70° 12' and the other of said slots has an angular length of some 107°.

12. A machine for travelling over a ground surface and adapted to support a plurality of apparatus assemblies each of which is arranged to distribute flowable material over the ground surface, said assemblies being supported in spaced relationship transverse to the intended path of travel and each such assembly comprising a vertical drive shaft, two rotary members mounted on said drive shaft in vertically spaced relationship, and a mask surrounding the upper one of said rotary members and having two slots therein in the plane of material centrifuged from the upper one of said rotary members, a funnel portion in which material interrupted by the mask walls between said slots can collect, and a duct for discharging the material collected in said mask to the lower one of said rotary members, each said assembly having its mask fixed with respect to the machine and said machine including means for delivering flowable material to the upper one of the rotary members in each apparatus assembly.

13. A machine as claimed in claim 12 and wherein the mask of each machine is so disposed relative to the intended path of travel that one of said slots directs an arcuate spray pattern of material in the direction of travel and the other slot directs an arcuate spray pattern of material in the direction away from the intended path of travel with the mid-points of the two spray patterns lying in the vertical plane passing through the rotational axis of the apparatus and parallel to the direction of travel.

14. A machine as claimed in claim 12 and wherein each apparatus is supported between 1 ft. and 2 ft. above ground level and the apparatus assemblies are spaced apart so that, at ground level, the spray pattern from each assembly just touches the spray pattern of the assembly or assemblies adjacent thereto or overlaps the spray pattern of the assembly or assemblies adjacent thereto by one half the transverse width of the spray pattern.

15. A machine as claimed in claim 12 and wherein said machine includes a common reservoir for material to be distributed, supply ducts for supplying material from said reservoir to each apparatus, metering means for metering the supply of material to each apparatus, cut-off means for terminating the supply of material to each assembly when the ground speed of the vehicle falls below a predetermined value, and an individual drive to the drive shaft for each apparatus.

* * * * *